March 5, 1957  F. SCHAUB  2,783,889
PROCESS AND APPARATUS FOR THE SEPARATION OF GRANULAR MATERIALS
Filed Dec. 4, 1951
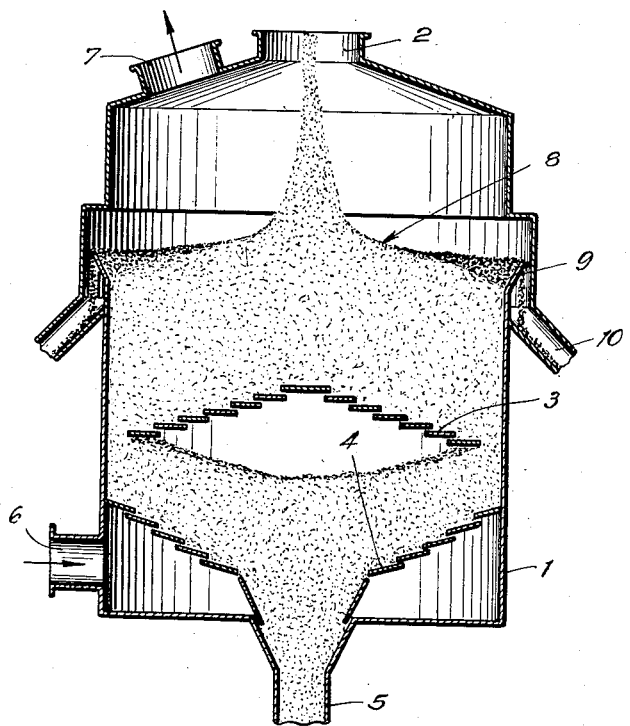
INVENTOR
Franz Schaub
BY Burgess & Dinklage
ATTORNEY

United States Patent Office 2,783,889
Patented Mar. 5, 1957

2,783,889

PROCESS AND APPARATUS FOR THE SEPARATION OF GRANULAR MATERIALS

Franz Schaub, Oberhausen-Holten, Germany, assignor to Ruhrchemie Aktiengesellschaft, Oberhausen-Holten, Germany, a German corporation Application December 4, 1951, Serial No. 259,795

Claims priority, application Germany January 15, 1951

6 Claims. (Cl. 209—474)

This invention relates to a process and apparatus for the separation of granular materials. It more particularly relates to the separation of granular materials of different grain size or different specific gravity with flowing fluids.

In the contacting of mixtures of granular materials with gases such as for example for their drying or cooling a process is known in which the granular materials are passed downward over gas permeable surfaces such as grid surfaces or perforated plates while gases are blown through the openings in the gas permeable surfaces such as between the openings in the grid plates or between the perforations in the perforated plates and flow through in counter-current contact with the downward moving granular materials. This method may be applied to any processes of the contacting of granular materials with gases such as processes for the physical and chemical treatment of various raw materials.

This known process may also be used for the contacting of granular materials with liquids and with liquids and gases.

The flow velocity of the fluids i. e., the gases and/or liquids in this method may be increased to such an extent that the weight of the material treated on the gas permeable surface is substantially decreased or completely nullified without interfering with a proper downward flow of the granular material.

One object of this invention is the separation of granular materials into constituents of different grain size or different specific gravity in the above mentioned process for the counter-current contacting of granular materials with fluid. This and still further objects will become apparent from the following description read in conjunction with the drawing which diagrammatically shows a vertical cross section for an apparatus for effecting the process in accordance with the invention.

It has now been found that in the process where granular materials are passed downward over a fluid permeable surface and fluids are passed upward through the fluid permeable surface in contact with the granular material a separation of the granular material into constituents of different grain size or different specific gravity will be obtained by increasing the velocity of the fluid to such an extent that certain of the specifically lighter portions are caused to eddy or are carried upward on the gas and may be removed at the upper portion of the contacting zone while the specifically heavier portions are removed in the usual manner from the lower portion of the contacting zone. The flow velocity of the fluids should be increased to such an extent that at least a complete eddying of the specifically lighter constituents of which separation is desired is obtained and without causing the specifically heavier constituents to pass into a complete eddying state.

In accordance with the invention, the granular material in the treating process is in the form of a contiguous bed of appreciable layer height.

In accordance with the invention the dust-like or specifically lightest portion of the granular materials may be discharged with the treating liquids while the coarse grains of the specifically heaviest portions are removed at the lower portion of the contacting zone in the usual manner. A portion of the granular material which is specifically lighter than the heavy portions which are removed in the lower portion of the treating zone and which are specifically heavier than the dust-like portions removed with the fluids will be passed into a complete eddying condition and will accumulate at the surface of the material layer present within the contacting zone and may be allowed to flow off through an opening provided at this point.

In operation when a suitable flow rate of the fluid is obtained the portion of the granular material of the larger grain size of a sufficient high density will travel down in the usual manner in the apparatus used for effecting the process. The constituents of the mixture of a smaller diameter or of lower density however will be passed into a complete eddying condition and will accumulate at the surface of the material layer present in the treating vessel. These constituents of the mixture are carried in an upward direction by the flowing gases or liquids through the spaces between the coarse grains. At the surface of the material layer they pass at a sufficient flow rate of the fluid into a suspended or eddying state so that they may be discharged through an outlet opening as for example through an overflow weir installed in a suitable manner either continuously or as batches. The constituents of the mixture which are so small or the specific gravity of which is so low that they may still be carried by the fluid medium after it has passed through the material layer will be discharged along with the fluid. This fraction carried off with the fluid is usually the fine-grained or dust-like portion.

It is possible in accordance with the invention to vary the range of the grain sizes which run off in a downward direction or pass into the eddying condition or are carried out with the gas or liquid stream by changing the rate of flow of the fluid passing through the material in counter-current contact therewith.

The new process will be explained in further detail with reference to the accompanying drawing.

The treating vessel or container 1 shown with a round cross section may have any desired cross section. The granular material mixture is passed into the treating vessel 1 through an opening defined in the top thereof 2 filling the container in the form of a contiguous bed of appreciable layer height. At first the material passes over the conically shaped fluid permeable surface formed as a conically shaped grid surface 3. At the edges of the grid surface 3 the material passes on to the second gas permeable surface formed as a funnel shaped grid surface 4. From the funnel grid surface 4 the material passes out of the treating vessel 1 through the discharge opening 5 defined at the bottom thereof. The cross section of the discharge opening 5 may be controlled in relation to the material input and the layer depth of material desired.

Below the funnel shaped grid 4 the treating fluids i. e., gases and/or liquids are fed in through a pipe line 6 and after their passage through the material layer are discharged at the top of the treating vessel through the pipe 7. Near the surface 8 of the inflowing granular material an overflow edge 9 is defined over which the fine-grained suspended portions of the material can flow off. These fine-grained portions after passing over the overflow edge 9 pass into discharge channels and may be removed in any desired manner.

If the treating vessel 1 is formed with a rectangular cross section for example instead of a round cross section the fluid permeable surfaces defined by the grid surfaces 3 and 4 are formed by grid plates which are arranged in the form of steps one above the other. In addition the overflow edge 9 will be defined by straight plate edges. Vessels of any other desired cross section may also be used in an analogous manner.

Instead of the two grid surfaces shown arranged above each other in the form of a cone and a funnel any desired number of fluid permeable surfaces such as grid or perforated plate surfaces may be arranged alternately above each other in the form of cones and funnels or arranged above each other in the form of steps.

With the use of the apparatus illustrated in the drawing for example it has been found possible with a suitably selected rate of air flow to separate a material mixture consisting of granular material of 0–5 mm. grain size into a portion of 1.5 to 5 mm. grain size which passed out of the discharge pipe 5, a portion of 0.3 to 1.5 mm. grain size which is drawn off at the overflow edges 9 and portions of 0 to 0.3 mm. grain size which are withdrawn with the air escaping through the pipe line 7. It is also possible to vary the grain fraction within the numerical limits mentioned above depending on the gas flow rate.

The process according to the invention may also be successfully effected even if the fluid flow rate is increased to such an extent that the coarse-grained portions begin to pass into a suspended state.

If the granular materials or mixture of materials in the downward motion over the grid surfaces are treated with a liquid in counter-current flow contact separation of the material according to grain sizes or specific gravity may be obtained by a suitable liquid flow rate. Of course the order of sizes of the individual grain fractions in this case is different from that obtained in the treatment with flowing gas.

The process according to the invention may also be used for the dust removal from mixtures which in addition to normal grain sizes contain dust-like constituents. In this case no intermediate fraction passing into the suspended state is discharged at the material surface. The dust-like portions of the mixture will be passed out of the treating apparatus with the outflowing fluids.

Cooling or any other desired treatment effected by the contacting of the material with fluids may be effected simultaneously with the dust removal or with the separation into various sized fractions described above.

In the dust removal for example of calcium ammonium nitrate or similar fertilizer salts it has been found that most of the dust-like portions with a grain size below 0.3 mm. may be removed by using an air flow rate of 0.5 to 0.6 m. per second. The layer depth of the granular material in the treating apparatus should be adjusted to about 20 to 500 mm. A layer depth of 50 to 200 mm. has been found particularly advantageous.

The dust removal and the degree thereof may be suitably controlled by regulating the linear air or gas rate and the layer depth.

When the treating fluid is a liquid it is possible, similar to the dust-removal from material with gases, to separate the fine constituents of the mixture which due to the fineness of grain are continuously carried off by the liquid.

I claim:

1. Apparatus for the separation of granular material into constituents of different grain size or different specific gravity which comprises means defining a vertical container of substantially circular cross section with a granular material inlet opening and a gas outlet opening at the upper portion thereof, means defining at least one funnel shaped inclined surface for the passage of granular material thereover and gases therethrough centrally positioned in the cross section of said container in the lower portion thereof, means defining at least one conically shaped inclined surface for the passage of granular material thereover and fluids therethrough centrally positioned in the cross section of said container and in spaced relation above said funnel shaped inclined surface, a gas inlet pipe positioned in the lower portion of said container below said inclined surfaces, a discharge opening defined at the lower portion of said container for the passage of granular material therethrough after passage over said inclined surfaces, and means defining an overflow exit for granular material from the surface of a layer of granular material in said container.

2. Apparatus according to claim 1 in which said inclined surfaces are defined by multiple spaced apart angular grid plates.

3. Process for the separation of mixtures of granular material into constituents of different grain size or different specific gravity which comprises substantially continuously passing granular material downward through a vertical zone of substantial cross-section, containing at least one gas-permeable funnel-shaped inclined path of travel for granular material from the lower portion of said zone, in the form of a contiguous bed having a layer depth of 20–500 mm. above said funnel-shaped inclined path of travel, substantially continuously passing at least one gas upwardly through said funnel-shaped inclined path of travel through said zone in counter-current contact with said granular material at a flow velocity of between about 0.5–0.6 meter per second sufficient to carry the lighter grains therewith while allowing the heavier grains to pass counter-current thereto, recovering the heavier grains from the lower portion of said zone and recovering the lighter grains from the upper portion of said zone.

4. Process according to claim 3 in which said granular material is additionally passed downwardly over a conically-shaped gas-permeable inclined path of travel in said zone spaced above said funnel-shaped inclined path of travel, and in which said gas is passed upwardly through said conically-shaped inclined path of travel in counter-current contact with said granular material.

5. Process for the separation of mixtures of granular material into constituents of different grain size or different specific gravity which comprises substantially continuously passing granular material downward through a vertical zone of substantial cross-section, contining at least one gas-permeable funnel-shaped inclined path of travel for granular material from the lower portion of said zone, in the form of a contiguous bed of appreciable layer height over said funnel-shaped inclined path of travel, substantially continuously passing at least one gas upwardly through said gas-permeable path of travel through said zone in counter-current contact with said granular material at a flow velocity sufficient to carry the lighest grains therewith, allow the heaviest grains to pass in counter-current thereto and to maintain a portion of the middle weight grains in an eddying state at the surface of the layer of granular material in said zone, removing the middle weight grains maintained in an eddying state at the surface of the granular material from said zone, recovering the heavier grains from the lower portion of said zone and recovering the lighter grains from the upper portion of said zone.

6. Process according to claim 5 in which the granular material is additionally passed downwardly over a gas-permeable conically-shaped inclined path of travel for granular material in said zone spaced above said funnel-shaped inclined path of travel, and in which said gas is additionally passed upward through said conically-shaped inclined path of travel.

References Cited in the file of this patent

UNITED STATES PATENTS

| Number | Name | Date |
| --- | --- | --- |
| 1,509,913 | Stebbins | Sept. 30, 1924 |
| 2,426,839 | Morris | Sept. 2, 1947 |
| 2,519,781 | Morris | Aug. 22, 1950 |
| 2,561,396 | Matheson | July 24, 1951 |
| 2,586,818 | Harms | Feb. 26, 1952 |